United States Patent [19]

van Aalst

[11] Patent Number: 4,659,262

[45] Date of Patent: Apr. 21, 1987

[54] MOBILE SELF CONTAINED PNEUMATIC CONVEYING SYSTEM

[75] Inventor: Gerhardt van Aalst, Kouderkerk aan den Rijn, Netherlands

[73] Assignee: Cyclonaire Bulk Cargo Systems, Inc., Henderson, Nebr.

[21] Appl. No.: 707,700

[22] Filed: Mar. 4, 1985

[51] Int. Cl.$^4$ ............................................. B65G 53/28
[52] U.S. Cl. .................................... 406/29; 15/340; 406/41; 406/43; 406/115; 406/109; 406/152
[58] Field of Search ................. 406/39, 115, 41, 42, 406/151–152, 29, 39, 43, 1.5, 116, 165, 166; 280/5 C, 2; 296/25, 151, 152; 15/340, 302; 141/387, 388, 69, 98; 239/164, 166, 169; 414/505, 507

[56] References Cited

U.S. PATENT DOCUMENTS

| | | | |
|---|---|---|---|
| 2,772,892 | 12/1956 | Hake et al. | 280/2 X |
| 3,150,404 | 9/1964 | Johnson | 15/340 X |
| 3,188,145 | 6/1965 | Strong | 406/41 |
| 3,348,258 | 10/1967 | Daneman | 15/340 X |
| 3,374,910 | 3/1968 | Hermanns | 406/109 |
| 4,140,349 | 2/1979 | Behnken | 406/39 |
| 4,140,350 | 2/1979 | Bentzen-Bilkvist et al. | 406/152 |
| 4,430,028 | 2/1984 | Clayton et al. | 406/39 |
| 4,433,946 | 2/1984 | Christianson et al. | 406/109 X |

Primary Examiner—Jeffrey V. Nase
Attorney, Agent, or Firm—Welsh & Katz Ltd.

[57] ABSTRACT

A mobile, self-contained, pneumatic granular material conveying system is disclosed which comprises a trailer at least one granular material receiving and discharging kettle mounted thereon. An articulated vacuum arm is rotatably mounted on the rear portion of the trailer. The vacuum arm is capable of being extended forwardly along the length of the trailer during storage and has an intake nozzle located at its outer end and a conveying line attached thereto for conveying material from the nozzle to the kettle. The vacuum arm is rotatable and vertically and horizontally moveable to provide three dimensional positive control of the position of the nozzle. As a result an operator may move the nozzle in the material to break up clumps. A pendant control electrically connected to the trailer permits the operator to position himself adjacent the granular material to be unloaded, which facilitates precise manipulation of the vacuum arm.

6 Claims, 4 Drawing Figures

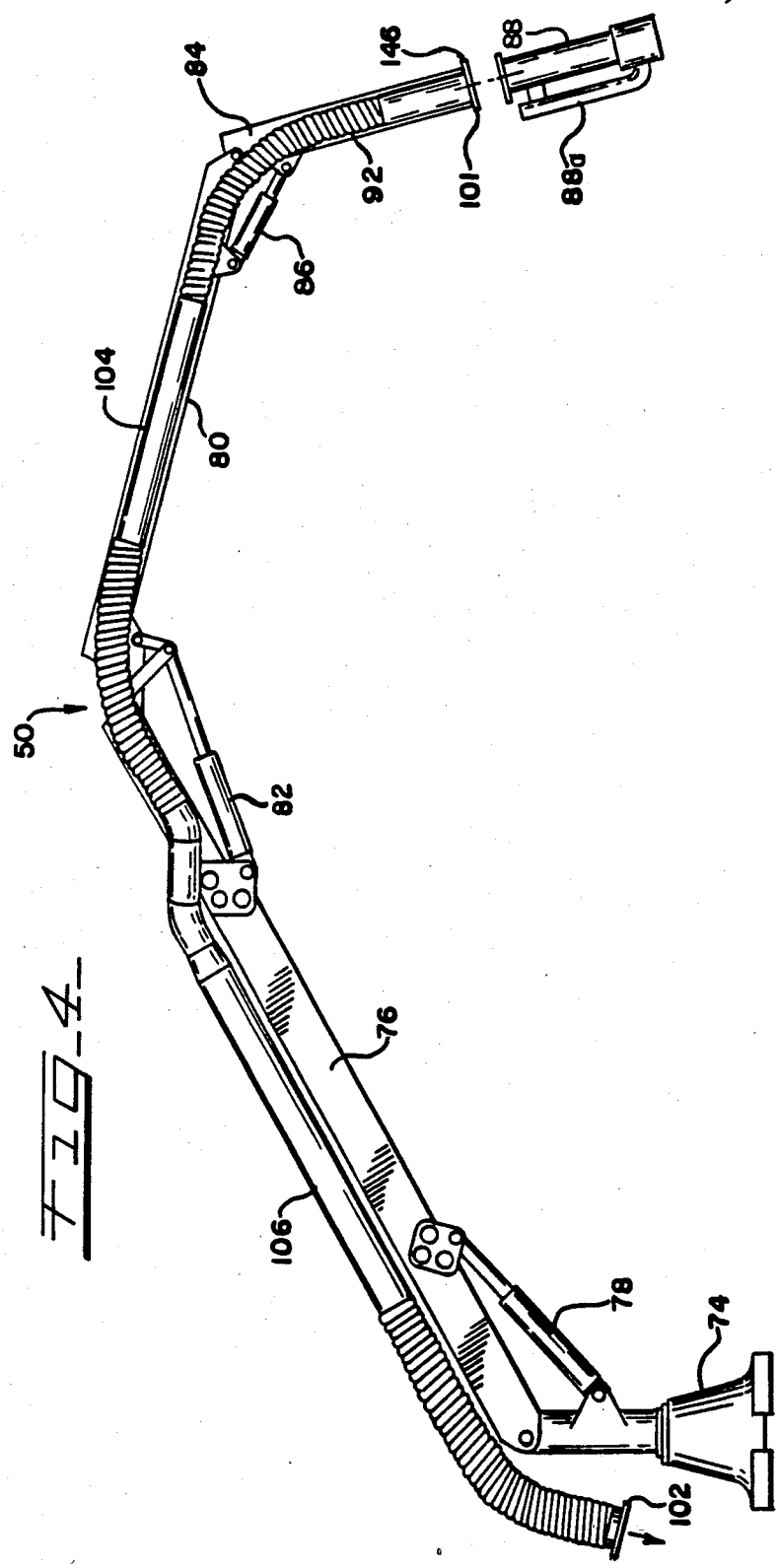

MOBILE SELF CONTAINED PNEUMATIC CONVEYING SYSTEM

BACKGROUND OF THE INVENTION

The present invention relates generally to pneumatic conveying equipment for granular or particulate material and in particular to a mobile self-contained pneumatic conveying system particularly useful in unloading material from barge and/or ship holds.

Pneumatic conveying equipment is widely used throughout the world for transporting granular material from vehicles such as rail cars or barges to a desired point of application such as a factory or silo. While there have been mobile pneumatic conveying systems in the prior art, they have not been particularly well adapted, in terms of size or nozzle manipulation, for use with barge or ship unloading where long distance conveying may be required.

Pneumatic systems are known to exist which employ a moveable boom carrying a suspended nozzle, but no easily transportable or mobile systems are known which utilize an articulated boom assembly having a simple, but effective intake nozzle and which precisely and positively positions the intake nozzle in the hold of a barge or ship.

Known prior art systems that convey large quantities of material require large scale motors which consume substantial quantities of fuel or electricity. Such systems have not been particularly concerned with reducing the energy required for effective conveying.

Accordingly, it is an object of the present invention to provide an improved mobile pneumatic conveying system for unloading barges and ships, which system has an articulated arm for positioning an intake nozzle precisely within a barge.

It is an additional object of the present invention to provide an improved pneumatic conveying system which reduces the amount of energy required to convey granular material.

Other objects and advantages will become apparent upon reading the following description while referring to the attached drawings.

BRIEF DESCRIPTION OF THE DRAWINGS

FIG. 4 of the drawings is a side view of the articulated vacuum arm of FIG. 1 showing in particular a boom section, a jib section and a stinger section and showing the vacuum hose as containing a first section and a second section of increased inside diameter.

DETAILED DESCRIPTION OF THE PREFERRED EMBODIMENT

Figure 1:
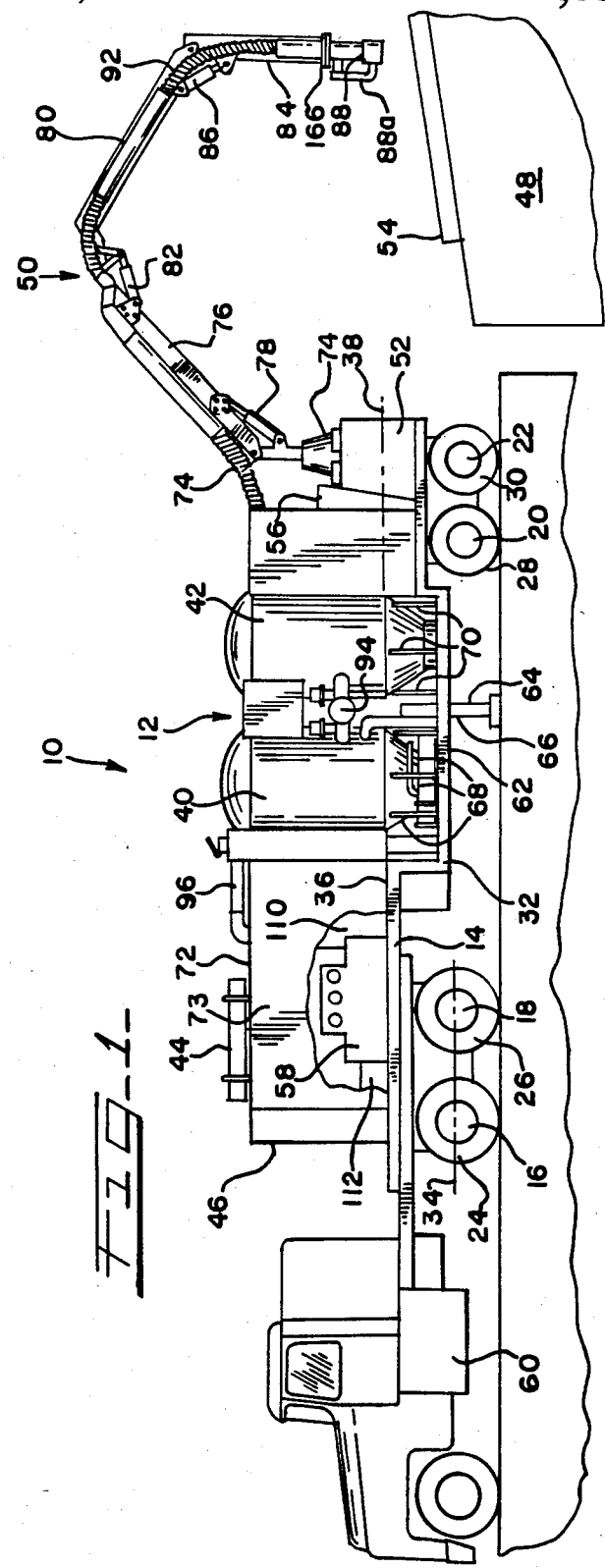
FIG. 1 of the drawings is an side view of a mobile self-contained barge unloading system.

The present invention relates generally to a pneumatic conveying apparatus and particularly to a mobile self-contained and powered pneumatic conveying system mounted on a trailer that is particularly adapted to unload material from barges or ship holds. The trailer has a central belly section which dips downwardly generally to the level of the axles of the trailer, to allow positioning of a pair of transfer kettles in the belly section. This allows the height of the kettles to be maximized to the legal limits for trailer traveling on federal highways. An air compressor is also mounted on the deck of the trailer for conveying granular materials from the kettle to storage. A vacuum pump is also mounted on the trailer for loading the granular material into the kettles.

An articulated vacuum arm carrying a conveying line is mounted on the rear portion of the trailer. When positioned for travel, the arm extends forwardly along the length of the trailer past the tops of the kettles. This arrangement maximizes the length of the vacuum arm mountable on the trailer without exceeding the legal limit for trailer length. The vacuum arm is constructed and arranged for extension into barge holds and for manipulation therein so as to facilitate conveying of the granular material within the barge into and through the conveying line to the kettles. Control mechanisms arre found both on the trailer and on a remote control pendant for operating the apparatus and for controlling the movement of the vacuum arm.

The articulated vacuum arm is mounted on a stand which is attached to the trailer deck. A boom section is rotatably mounted and extends from the stand. A hydraulic cylinder is provided to raise or lower the boom section. A jib section extends from the boom section and a hydraulic cylinder is provided to extend or retract the jib. An outer stinger section extends from the jib section and a hydraulic cylinder is also used to control its extension or retraction. The control mechanism separately controls the extension or retraction of each of the sections and also controls the pivoting of the entire arm on the stand, so that the arm can be positioned to conform to a desired shape during extension into the barge. During storage, the stinger section is folded into a 90° angle from the jib section and extends downwardly, and the jib and boom sections extend horizontally across the top of the trailer. This arrangement allows the maximum length arm to be utilized on a trailer falling within legal length requirements.

The present invention preferably utilizes a pendant control which can either be directly connected to the control mechanism on the trailer through a cable, or through a wireless (infrared or sonar) transmitter. With the use of a pendant controller, the operator can position himself adjacent the opening or hatch of the barge, where he can precisely control the movement of the vacuum arm within the barge. This eliminates the necessity of having an assistant stand at the barge hold and, either by radio or hand signal, convey necessary commands to an operator who cannot see the nozzle operation. The use of a pendant control also permits the operator to loosen crusted granular material in the barge by easily manipulating the vacuum arm and nozzle back and forth. This eliminates the requirement of mechanical spinners or air jets for loosening the material.

A further feature of the present invention is the use of a novel intake nozzle used for vacuum conveying granular material. The nozzle comprises a nozzle cylindrical shaped body and an orifice at the outer end thereof. One or more air tubes vented to atmosphere extend upwardly along the nozzle body a sufficient length so as to communicate ambient air into the nozzle even when the nozzle is submerged into the material to be conveyed. The nozzle is rigidly constructed so that it can be moved about in the granular material to break up clumps or clogs.

As mentioned above, the present apparatus includes one or more material transfer vessels (kettles) for receiving granular material from a supply receptacle such as a barge or ship. A vacuum source induces a vacuum alternately in the kettles so as to convey the granular material from the barge to the kettles. A conveying line comprising conduit sections connected by flexible hose between conduit sections extends to the barge for conveying this material.

Turning now to FIG. 1 of the drawings, the mobile self-contained barge unloading system 10 of the present invention contemplates the use of a pneumatic conveying apparatus generally shown at 12, mounted on a trailer 14 having a series of axles 16, 18, 20 and 22 upon which the trailer 14 is mounted. Axles 16, 18 20 and 22 in turn have a plurality of wheels 24, 26, 28 and 30, respectively. The trailer 14 in turn has a belly section 32 which is substantially coplanar with axles 16, 18, 20 and 22 along axis 34. The belly section 32 extends downwardly from deck 36, which is substantially coplanar with plane 38. The belly section 32 is constructed to hold the kettles 40 and 42.

The kettles 40 and 42 operate to receive and then expel granular material. The pneumatic conveying apparatus 12 operates by aspirating granular material into the kettle 40 until it is filled to a desirable level, at which time the flow of granular material into the kettle 40 is then cut off and diverted to fill the kettle 42. As the kettle 42 is filled, the material in kettle 40 is conveyed to a desired point of storage or use. A compressor assembly 44 is mounted on the front portion of trailer 14 and provides compressed air for selectively expelling the granular material from the kettles 40 and 42. A vacuum pump 46 is also mounted on the front of trailer 14 which provides vacuum for conveying granular material from the barge 48 to the kettles 40 and 42.

Figure 2:
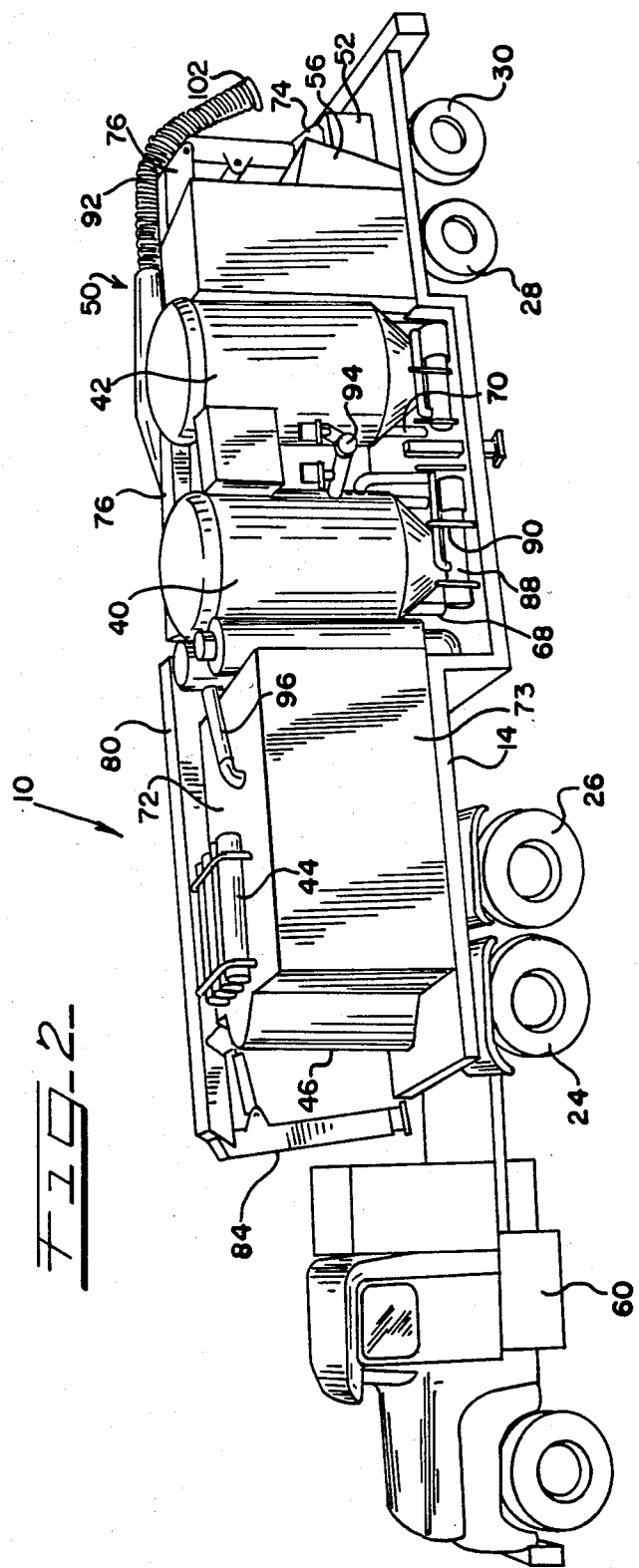
FIG. 2 of the drawings is a side perspective view, of the mobile self-contained barge unloading system of FIG. 1, showing in particular an articulated vacuum arm in its storage position.

A particular feature of barge unloading system 10 is an articulated vacuum arm 50 which extends from the rear deck 52 of the trailer 14. The articulated vacuum arm 50 as shown in FIG. 2, extends forwardly along the length of trailer 14 during storage. This design allows the size of kettles 40 and 42, and the length of vacuum arm 50 to be maximized without exceeding specified legal limits for trailer height or length. In the preferred embodiment, the trailer 14 is approximately 42 feet in length and 8 feet 6 inches wide. The vacuum arm 50 in a preferred embodiment has a length of 52 feet for maximum extension into barge hold 54 and manipulation therein. A control mechanism 56, mounted on the rear deck 52 of the trailer 14, is used by the operator when standing on rear deck 52 for actuating and controlling the compressor assembly 44, the vacuum pump 46 and the vacuum arm 50, so as to operate the entire system 10.

In a preferred embodiment, the barge unloading system 10 is diesel powered. The diesel power is provided by a diesel engine 58 located proximate the compressor 44. Alternatively, an electric motor may be utilized. In a preferred embodiment, the barge unloading system 10 is capable of conveying about 120 tons per hour over a distance of 150 feet. The size and weight of unloading system 10 permits it to travel over any federal roads in the United States and most state highways without the need for a special permit. For over the road movement, the system is preferably towed by a standard dual axle tractor 60. The system complies with all federal regulations as well as recommendations of the Truck and Trailing Manufacturing Association (TTMA).

The trailer 14 is fabricated out of high-strength structural steel for maximum strength and minimum overall weight. The belly section 32, has what is called a "double drop design" which allows the main cross beam 62 of the trailer 14 to be below all equipment and plumbing in the belly section 32. The height of belly section 32 is designed to provide maximum ground clearance but still permit the center supports 64 and 66 to reach ground level without the need for manually lowering the extensions. The crossbeam 62 in the belly section 32 is shaped to mate directly to the support legs 68 and 70 of the kettles 40 and 42.

The entire front section 72 of trailer 14 is enclosed in housing fabricated in light-weight aluminum or laminated fiberglass panels. This machine room enclosure 73 provides protection of the equipment contained therein from the weather for extended life, a reduction in wind resistance during transport, added security and a deterrent to vandalism while the system is not in operation, and a reduction in noise during operation. The machine room 73 located at the front third of trailer 14 contains pneumatic and hydraulic supply systems. Specifically, the vacuum pump 46, the compressor 44, a control compressor 108, a hydraulic pump 110, and a generator 112 are located in the machine room 72.

As further seen in FIG. 1, vacuum arm 50 is mounted on the right rear portion of rear deck 52. This off-center mounting allows vacuum arm 50 to be stowed over the full length of the trailer above the main material containment section of kettles 40 and 42 and beside the filter section without limiting the overall height of kettles 40 and 42.

Vacuum arm 50 comprises a rotatable stand 74, which is mounted on rear deck 52. A boom 76 extends from the rotatable stand 74. The boom 76 may be raised or lowered utilizing a hydraulic cylinder 78 which is connected to the stand 74 and boom 76. The hydraulic cylinder 78 in turn is powered by means of a hydraulic pump 110 driven by engine 58. An articulated jib 80 extends from the boom 76, and it is pivotally mounted on the boom 76 and has a hydraulic cylinder 82 connected to both the boom 76 and the jib for selectively extending or retracting the jib 80. A stinger 84 extends from the jib 80 which is selectively extendable or retractable by a hydraulic cylinder 86. The hydraulic cylinders 82 and 86 are also driven by the hydraulic pump 110. A nozzle 88 is connected to the stinger section of the vacuum arm 50 and the nozzle can be immersed into the granular material in barge 48. The nozzle is connected to a vacuum conveying line 92 that has rigid and flexible sections which accommodate the articulated movement of the arm and which convey the material from the nozzle to either one of the kettles 40, 42.

Returning to FIG. 2 of the drawings, the stinger section 84 may be folded at 90° from jib section 80 when jib section 80 and boom section 76 are extended horizontally across the top of the trailer 14, so as to facilitate storage thereof. The nozzle 88 is selectively attachable and removable from the vacuum arm 50 by means of a number of locking bolts, as previously described. When the nozzle 88 is removed from the vacuum arm 50, it may be stored in a mounting bracket 90 on the trailer 14.

The length of the boom section 76 and jib section 80 are preferably the maximum which can be accommodated by the length of the particular trailer 14. In the stowed position, the sections 76 and 80 occupy the entire length of the trailer. By removing the nozzle 88 and by having the stinger section extend downwardly, the vacuum arm length can be maximized without the need for disconnecting the entire vacuum conveying line 92. In its preferred embodiment, the flexible sections of the vacuum line 92 are constructed of rubber or butadiene compounds formulated for high resistance to abrasion.

Figure 3:
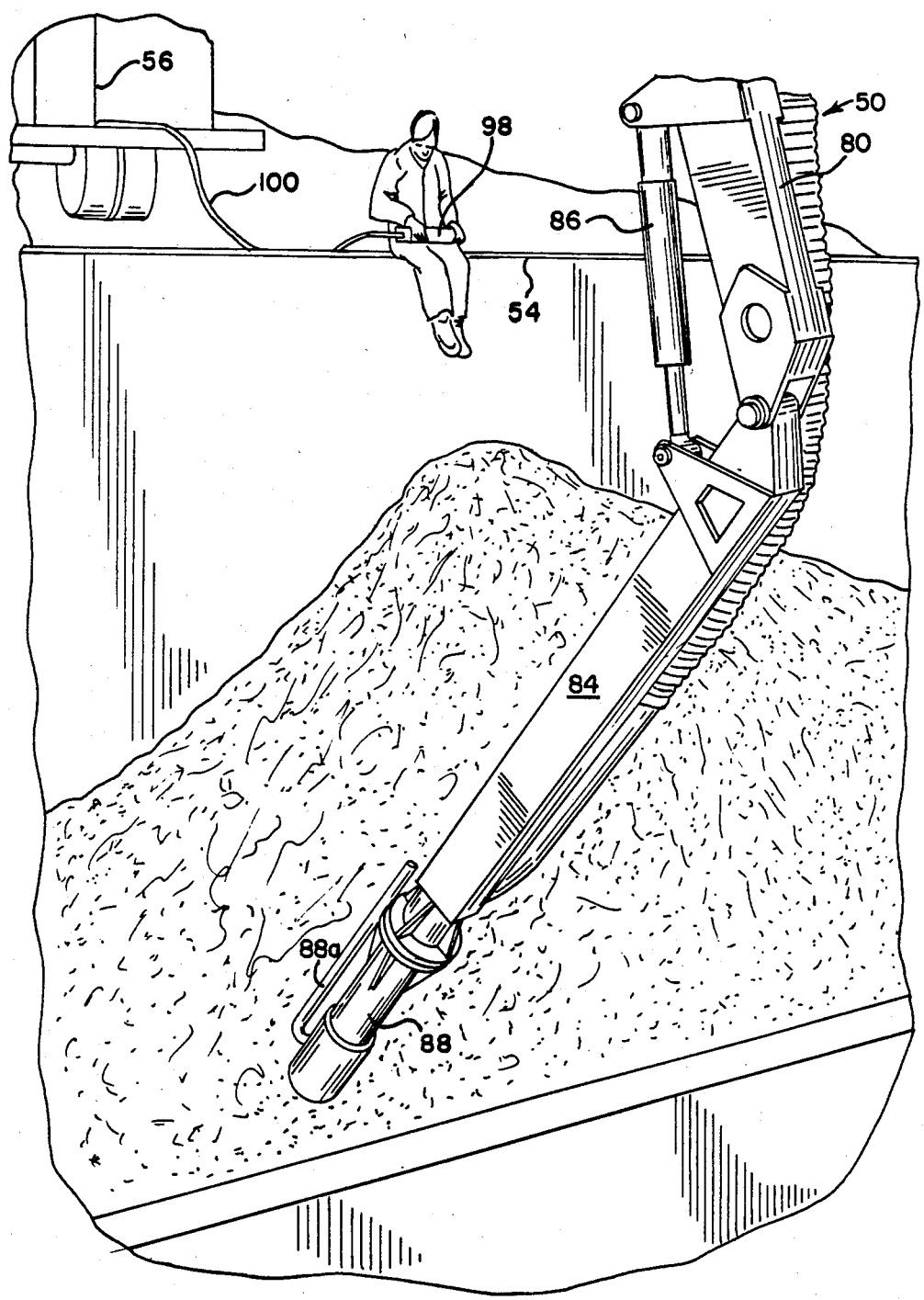
FIG. 3 of the drawings is a front perspective view of the mobile self-contained barge unloading system of FIG. 1 showing in particular an operator utilizing a remote control pendant to manipulate the vacuum arm in the hold of a barge.

As best seen in FIG. 3 of the drawings, an additional feature of the present invention is the use of a pendant control mechanism 98 which, in the embodiment shown, is electrically connected to the control mechanism 56 by means of a cable 100. A pendant control mechanism 98 has a plurality of control buttons attached thereto which can be manipulated so as to control the movement of the vacuum arm 50. In addition, through the use of a remote control device such as pendant control mechanism 98, the operator can position himself near the hatch 54 of barge 48 so that he can view the operation and more precisely position the vacuum arm 50 and nozzle within the hold. Since the nozzle 88 is bolted to the stinger section of the vacuum arm 50, positive control of the nozzle can be accomplished to dig into crusted material and break it up. This is a direct result of the fact that each section of the articulated vacuum arm is hydraulically controlled by cylinders and of the fact that the nozzle is securely attached to the singer section of the arm. Moreover, rotation of the arm by rotatable stand 74 enables the nozzle to be manipulated from side to side, as well as forward and backward, and vertically. Such three-dimensional movement eliminates the need for mechanical spinners, air jets or the like, which were utilized in the prior art. One or more air tubes, one of which is indicated at 88a, are mounted on the nozzle 88 so as to have one end thereof communicating with the internal passage within the nozzle while the opposite end of the air tube is vented to atmosphere. The air tube 88a is made of a sufficient length to enable ambient air to enter into the nozzle when submerged into a bulk material to be conveyed. The precise control of the position of the vacuum arm also permits it to be used to handle hatch covers and it can even be used with a front end loader for clean up operations.

As best seen in FIG. 4 of the drawings, the vacuum arm 50 has the associated conveying line comprising alternate sections of rigid conduit and flexible hose, with the line having an outer end 101 and an inner end flange 102. The nozzle is attached to the outer end flange 101 of the conveying line. The inner end flange is connected to a conduit section during operation that extends to the kettles 40 and 42. During transport, the flange 102 is disconnected so that the arm 50 can be rotated approximately 180° for storage as best shown in FIG. 2.

From the foregoing description, it should be understood that an improved mobile pneumatic conveying apparatus has been shown and described, which has many advantages over non-transportable systems of the type which utilize a suspended nozzle assembly. The fully controllable articulated arm to which a simple nozzle is attached enables the nozzle to be manipulated and positioned to remove all of the particulate material. The three-dimensional positive movement capability of the nozzle can break up clumps of material without the need for mechanical augers, spinners or the like.

It is understood that although preferred embodiments of the present invention have been shown and described, various modifications thereof will be apparent to those skilled in the art, and, accordingly, the scope of the present invention should be defined only by the appended claims and equivalents thereof.

Various features of the invention are set forth in the following claims.

What is claimed is:

1. A mobile, self-contained, pneumatic conveying system for use in conveying granular material comprising, in combination;

a mobile trailer having a plurality of wheeled axles and defining a belly section generally mid-length thereof extending downwardly from the general surface elevation of said trailer, said trailer having a deck structure on a rear end portion thereof, at least one transfer kettle supported on said belly section and having an upper end surface of a height approximating a predetermined highway limit, a vacuum pump supported on said trailer and operatively associated with said kettle in a manner enabling application of a vacuum to said kettle for selectively drawing granular material into said kettle from a source of bulk granular material, a compressor assembly supported on said trailer in operative association with said kettle in a manner enabling application of fluid pressure to said kettle so as to discharge granular material therefrom, an articulated vacuum arm assembly including a generally upstanding stand mounted on said deck structure for rotation about a substantially vertical axis offset from the longitudinal centerline of said trailer, said stand defining a pivot axis at its upper end at a height below the height of said kettle, a boom section pivotally connected to the pivot axis of said stand for pivotal movement relative thereto, a jib section pivotally connected to said boom section at an end thereof opposite said stand, a stinger section pivotally connected to said jib section at an end thereof opposite said boom, an intake nozzle connected to an outer end of said jib section, and a conveying line operatively connected to said nozzle and said kettle in a manner enabling granular material to be conveyed from said nozzle to said kettle during operation of said vacuum pump, said vacuum arm assembly being manipulatable to provide three-dimensional control of said nozzle to facilitate operator manipulation of said nozzle in a bulk source of said granular material to break up clumps of the material, and being manipulatable to move said arm assembly to a storage position extending longitudinally forwardly of the trailer ofset from the longitudinal centerline of said trailer and below the height of said upper surface of said kettle, and control means mounted on said trailer for controlling selected manipulation of said vacuum arm assembly.

2. The system as defined in claim 1 wherein said stinger section is adapted for folding to substantially right angle relation to said jib section when said jib and boom sections are extended longitudinally forwardly of said trailer during storage thereof.

3. The system as defined in claim 1 wherein said control means includes a module control operatively associated with said vacuum arm so as to enable manipulation thereof from a position remote from said trailer whereby the operator may position himself adjacent a source of bulk material to be conveyed and manipulate said nozzle within said bulk material.

4. A system as defined in claim 1 wherein said arm assembly includes a fluid pressure operated cylinder operatively interconnected between each of the arm sections adjacent their mutually pivotally connected ends thereof, said control means being operative to effect selective movement of said pressure cylinders so as to effect articulated relative movement between the various arm sections.

5. The system as defined in claim 1 wherein said nozzle includes at least one air tube interconnected to an internal passage of said nozzle and extending along said nozzle body a distance sufficient to enable introduction of ambient air into the nozzle when submerged within a source of bulk material to be conveyed.

6. The system of claim 1 wherein said nozzle is selectively attachable or removable from said vacuum arm assembly.

* * * * *